United States Patent [19]
Stenne

[11] 3,947,598
[45] Mar. 30, 1976

[54] MANUFACTURE OF PROTEIN FOODS
[75] Inventor: Pierre Stenne, Lozon, France
[73] Assignee: Claudel S.A., Courbevoie, France
[22] Filed: June 18, 1974
[21] Appl. No.: 480,575

[30] Foreign Application Priority Data
June 18, 1973 France............................ 73.22086

[52] U.S. Cl. ..................... 426/36; 426/44; 426/46;
426/250; 426/582; 426/656; 426/495; 210/23 F
[51] Int. Cl.² ...................... A23C 19/00; A23J 3/00
[58] Field of Search ............ 426/36, 150, 185, 188,
426/271, 356, 361, 491, 49, 582, 656;
210/23 U, 490, 321

[56] References Cited
UNITED STATES PATENTS
3,502,481  3/1970  Schaap et al. .................. 426/356 X
3,743,516  7/1973  Lundstedt et al. ............... 426/271 X OTHER PUBLICATIONS
Michaels, A. S., "New Separation Technique for the CPI," Chem. Eng. Prog. Dec., 1968, pp. 31–43.

Primary Examiner—A. Louis Monacell
Assistant Examiner—R. A. Yoncoskie
Attorney, Agent, or Firm—Kenyon & Kenyon Reilly Carr & Chapin

[57] ABSTRACT

A process for the production of a protein food, especially cheese, which comprises coagulating the coagulable proteins of a milk, treating the curd obtained by ultrafiltration on at least one semi-permeable membrane and collecting a concentrated curd of which the dry solids content and the ratio by weight of proteins to non-proteins are substantially equal to those of the end product.

13 Claims, No Drawings

MANUFACTURE OF PROTEIN FOODS

This invention relates to a process for the production of protein foods, especially cheese.

The manufacture of cheese by conventional methods generally involves a succession of separate operations, the first of which is the preparation of a coagulum or curd. In this operation, the casein in the milk is coagulated by the action of an enzyme or enzymatic system, such as rennet, or by biological acidification obtained by adding lactic ferments. Acidification may optionally be combined with the action of the rennet. The curds obtained are either rennet curds or lactic curds, depending upon the relative proportions of rennet and ferments used, the intermediates being in the form of half-rennet, half-lactic curds. Coagulation, of which the effect is to transfer the casein from a colloidal phase to a precipitated phase, is accompanied by the formation of a liquid known as serum or whey which entrains the water soluble substances, such as serum proteins (lactalbumin for example), lactose, non-complexed mineral salts, etc. and which is expelled more or less rapidly and more or less spontaneously.

Separation of the liquid and precipitated phases is carried out or completed during the operation known as "draining" where the curd, previously cut and disposed on a surface or in suitable moulds, exudes the serum. The cutting or subdividing of the curd is an important operation because, by increasing the syneresis surface, it enables the draining rate, which is partly responsible for the chemical composition of the curd, to be adjusted. It is for this reason that a predominantly rennet curd drains very rapidly, which does not allow the serum to become sufficiently acidified under the influence of the lactic ferments to entrain the mineral substances fixed to the casein. A curd of this kind is hardly "demineralised" and its further processing gives cheeses of the hard or cooked curd kind. By contrast, predominantly lactic curds, whose draining is sufficiently slow for the serum to dissolve and to entrain all the mineral substances, are highly demineralised and lead in particular to cheeses of the fresh curd type. There is obviously a whole range of curds having an intermediate composition from which cheeses of the soft curd or semi-firm curd kind are produced.

In traditional cheese making, draining is an operation of fairly long duration which necessitates large rooms specially adapted for this purpose and considerable manual labour. In addition, cheeses of the "fresh curd" type are manufactured, as previously mentioned, from lactic curds which only exude the serum very slowly. Normally, draining is carried out in bags or, better still, by centrifuging, operations which are either labour-intensive or involve additional outlay on machinery.

An object of the present invention is to obviate these disadvantages. The invention relates to a process for the production of a protein food, especially cheese, which comprises coagulating the coagulable proteins of a milk to provide a curd, treating the curd obtained by ultrafiltration on at least one semi-permeable membrane and collecting a concentrated curd of which the dry solids content and the ratio by weight of proteins to non-proteins are substantially equal to those of the protein food.

In the context of the invention, milk is, on the one hand, a milk of animal origin, such as milk obtained from cows, goats, ewes, cow buffalos, zebras, mares, asses, camels, etc. This milk can be a milk in the "native" state, a standardised and/or homogenised milk, a reconstituted milk, a skimmed milk or, finally, a milk which has been subjected to the treatments commonly applied in dairy technology, for example pasteurisation, UHT (ultra-high temperature) sterilisation or HTST (high-temperature short time) sterilisation. On the other hand, the term milk as used in the context of the invention also applies to the milk commonly known as "vegetable milk", i.e. an extract of optionally treated vegetable matter, such as the leguminosae (soya, chickpeas, lentils, etc.), or oleaginous plants (for example rape, sesame or cotton), extracts of this kind containing proteins in solution or in colloidal suspension which can be coagulated by the conventional techniques referred to above, by chemical action and/or under heat. Vegetable milks of this kind may have been subjected to heat treatments similar to those applied to animal milks. They may also have been subjected to treatments that are specific to them, such as decolouration, deodorisation and treatments for suppressing undesirable tastes. Finally, the word milk as used in the context of the invention also applies to mixtures of animal and vegetable milks, each of them optionally having been subjected to the preliminary treatments described above. Most preferably, the starting material in the process of the invention is a cow's milk which may have a protein to lactose ratio in the range 0.5:1 to 0.9:1. The milk is desirably substantially free of fat, as this facilitates the ultrafiltration operation. For example, a skimmed milk, containing 7 to 11% dry matter may be used.

The concentrated curd is the "retained" fraction which does not pass through the semi-permeable membrane and which therefore contains the compounds of high molecular weight, especially the proteins. Finally, the end product in the context of the invention is the product ready for packing, which by no means implies that the product in question cannot be subjected to complementary technological treatments such as, for example, enrichment with fats, aromatisation or colouring or, in the case of a product of the cheese type, subsequent development such as, for example, maturing and/or ripening.

The phenomena of coagulation by rennet and by biological acidification were discussed earlier. They are well known among experts and need not be described here. Coagulation can also be induced by chemical action, for example by the addition of metal cations or of a mineral acid, such as hydrochloric acid, or of an organic acid such as citric acid or lactic acid, or even, within certain limits, by heat, although an excessive or over-prolonged increase in temperature is prejudicial to the proteins. Finally, coagulation can, if necessary, be satisfactorily carried out by any combination of the means described above.

Ultrafiltration is a technique in which the constituents of a mixture are separated according to their molecular weight. For this purpose, the mixture to be treated is passed under an adequate pressure through a semi-permeable membrane which allows the constituents of low molecular weight to pass through relatively easily, whilst the constituents of high molecular weight are retained. It is essential to generate turbulence in order to avoid polarisation at the level of the membrane which would have an adverse effect upon the efficiency of the operation. The selectivity of this membrane, which is also known as the "separation zone"

(minimum average molecular weight of the substances which do not pass through) is obviously governed by its chemical and/or physical constitution. Commercially available membranes are usually made of cellulose acetate, polyvinyl chloride or polyacrylonitrile.

The curd, having the same composition as the milk starting material is passed through a membrane designed to retain all the proteins, but to allow through all the non-proteins. The working pressure and temperature should be compatible with the mechanical strength of the membrane or membrane/support assembly. In general, the pressure is from 1 to 60 atms and the temperature from 0° to 70°C. In order not to affect either the integrity or the properties of the curd, it is best to apply temperatures in the range from 5° to 30°C and pressures in the range from 1 to 20 atms.

In order to provide the end product with particular characteristics, the process according to the invention can be completed by various additional and optional operations such as, for example, modification of the starting milk by any means known to the expert, by the addition of proteins for example, or even homogenisation or milling. The concentrated curd itself can be subjected to homogenisation or milling. It can be packed as such or converted into powder form, for example by lyophilisation. It is possible to add to the curd fats, flavourings, aromatics, spices and/or colourants, or to increase its volume by whipping or to inoculate it with microorganisms for developing a particular flavour and/or for modifying its texture during maturing and/or ripening.

For practical application, the process according to the invention necessitates the use of an "ultrafiltration module" which generally comprises a large number of membranes arranged in series and in parallel on supports in the form of porous plates arranged adjacent one another at regular intervals, or in the form of porous tubes arranged in bundles. Ultrafiltration modules are available on the chemical industry market. These modules can be used in different ways. In a first batch-type application, a batch of curd is ultrafiltered, the concentrated curd separately collected and, on completion of the operation, reintroduced into the ultrafiltration module. These operations are continued until the concentrated curd has the required composition. Another, semi-continuous application also starts with a batch of curd, except that in this case the concentrated curd formed is continuously recycled through the tank which initially contained the batch of starting curd. Development of the compositions as a function of time is preferably predetermined for a given curd, other factors remaining constant, with the result that it is possible during production to obtain a suitable concentrated curd simply by selection of the ultrafiltration time. Another method of application which is of commercial interest because it is continuous, is based on the use of an assembly of identical or different modules arranged in series and comprising as many units as is necessary to obtain the required concentrated curd.

In one particular embodiment of the invention, a curd is prepared by the coagulation, with lactic ferments and traces of rennet, of a skimmed milk containing approximately 9% of dry solids and having a protein to lactose ratio of about 0.7. After standing for 12 to 36 hours at around 15° to 25°C, a lactic curd of thin consistency is obtained. By virtue of its thin consistency, this lactic curd can readily be pumped and introduced into an ultrafiltration module. It is ultrafiltered under a pressure of from 1 to 20 atms, preferably under a pressure around 10 atms, at a rate of about 4000 to 5000 $l/h/m^2$ of membrane at a temperature in the range from 5° to 30°C, advantageously at a temperature of 20°C. This operation has one major advantage over traditional draining insofar as the serum proteins, normally eliminated with the whey, remain in the concentrated curd, thereby increasing the overall yield of the conversion of milk into cheese by approximately 12%, based on the end product. In addition, it is found that, in spite of the apparent relative viscosities of the milk and curd, the curd can be ultrafiltered much more easily because the surface area of membrane required for the same volume is reduced by a factor of 3 to 4.

In this embodiment, the concentrated curd collected has a dry solids content of from 10 to 20%, preferably from 13 to 15%, these values corresponding to a protein: lactose ratio of 1.2 to 1.6. A concentrated curd of this kind is in fact a cheese of the fresh curd type which is either edible as such or which can be modified by the addition of fats, flavourings, aromatics, spices and/or colourants. If necessary, all these products can be pasteurised or sterilised.

The following Examples illustrate the application of the process according to the invention, although it is by no means limited to the conditions described therein.

EXAMPLE 1

300 liters skimmed cows milk having a solids content of 9%, which has been pasturised for 30 seconds at 90°C in a plate-type pasteuriser, are poured into a 400 liter tank equipped with an outlet pipe, followed by the addition of 1.5 cc of 1/10,000 rennet and 6 liters of mesophile lactic starters. After standing for 24 hours at a temperature 19°C, a curd of friable texture with a pH-value of less than 4.6 is obtained. The outlet pipe of the tank is then connected through a positive displacement pump (make PCM, type L 62 G) to the inlet end of an ultrafiltration module (make ABCOR, type UF 44 S) comprising 20 cellulose acetate membranes, each with a surface area of 0.2 $m^2$, wound around porous cylindrical supports. The 20 membranes are arranged in two groups of 10 membranes fed in parallel. By means of the pump, the curd is delivered into the module at a rate of 16,000 l/h, the concentrated curd being recycled to the tank commensurate with its concentration. All these operations take place at ambient temperature, i.e. at around 20°C. After 1 hour and 15 minutes, the installation is stopped and a product with a dry solids content of 13% and a protein:lactose ratio of 1.2 is collected in the tank. After cooling to 10°C, this product is in the form of a malleable paste edible as white skim-milk curd cheese. The texture is homogeneous and smooth and does not necessitate subsequent homogenisation or milling.

EXAMPLE 2

18 kg of cream containing 500 g of fats per kg and 4.5% of non-fat solids are added to 100 kg of concentrated curd with a dry solids content of 13% obtained as described in Example 1. Homogenisation gives a mixture with a total dry solids content of 19.3% and a ratio by weight of fats to non-fats of 40%. This mixture constitutes a fresh cheese which can be eaten as such or following the addition of fresh or dry parsley, crushed garlic, pepper and/or salt.

We claim:

1. A process for the production of a protein food, especially cheese, which comprises coagulating the coagulable proteins of a vegetable or an animal milk to provide a curd, treating the curd obtained by ultrafiltration on at least one semi-permeable membrane and collecting a concentrated curd of which the dry solids content and the ratio by weight of proteins to nonproteins are substantially equal to those of the protein food.

2. A process as claimed in claim 1, wherein the curd is treated by ultrafiltration at a pressure in the range from 1 to 20 atms.

3. A process as claimed in claim 1, wherein the curd is treated by ultrafiltration at a temperature in the range from 5° to 30°C.

4. A process as claimed in claim 1, wherein a concentrated curd with a dry solids content of from 10 to 20% is collected.

5. A process as claimed in claim 1, wherein the milk is a skimmed milk.

6. A process according to claim 1, in which the curd is homogenised or milled before ultrafiltration.

7. A process according to claim 1, in which the concentrated curd is homogenised or milled.

8. A process for the preparation of a cheese which comprises coagulating the coagulable proteins of a skimmed milk to provide a curd, treating the curd by ultrafiltration at a temperature of 5° to 30°C and collecting a concentrated curd having a dry matter content of 10 to 20% by weight.

9. A process as claimed in claim 8, wherein the curd is treated by ultrafiltration at a pressure in the range from 1 to 20 atms.

10. A process according to claim 8, in which at least one of a fat, a flavouring, a seasoning, a spice and a colouring is added to the concentrated curd.

11. A process according to claim 8, in which the curd is homogenised or milled before ultrafiltration.

12. A process according to claim 10, in which the concentrated curd is homogenised or milled.

13. A process for the production of a protein food comprising the steps of
coagulating the coagulable proteins of a vegetable or an animal milk to provide a curd while transferring casein in the milk from a colloidal phase to a precipitated phase and simultaneously forming a liquid serum entraining water soluble substances including serum proteins therein; and
ultrafiltrating the curd under a pressure of from 1 to 60 atmospheres and a temperature of from 0° to 70°C to retain said serum proteins in the curd while removing said liquid serum and to thereby obtain a concentrated curd of which the dry solids content and the ratio by weight of proteins to nonproteins are substantially equal to those of the protein food.

* * * * *